E. A. CROSTON AND K. CHROBAK.
TROLLEY WIRE GUARD.
APPLICATION FILED JUNE 11, 1920.
1,356,603.
Patented Oct. 26, 1920.
2 SHEETS—SHEET 1.
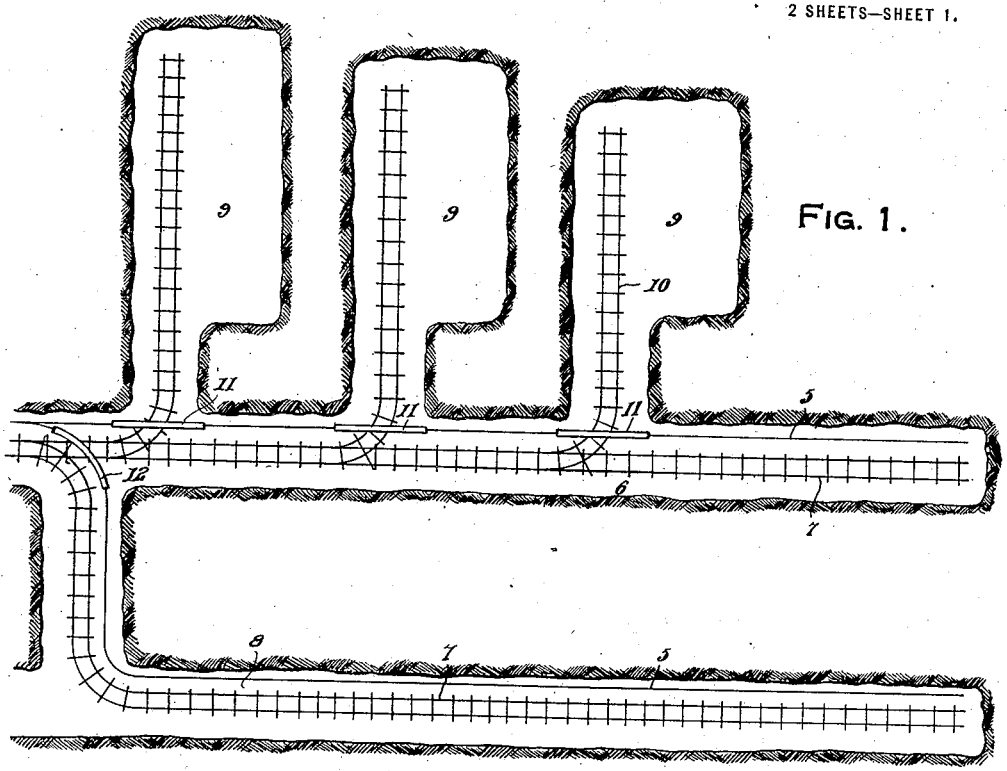
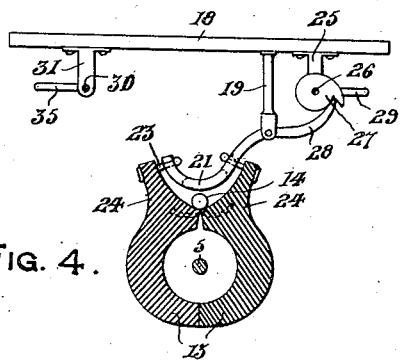
Fig. 4.
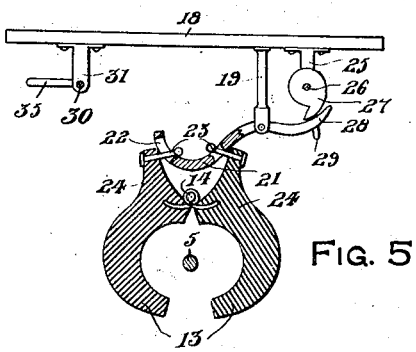
Fig. 5.
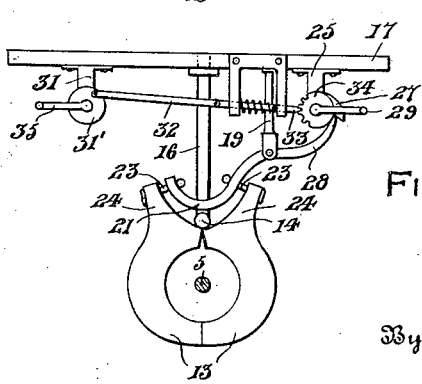
Fig. 3.
Inventors
E. A. Croston
K. Chrobak
By A. M. Wilson,
Attorney E. A. CROSTON AND K. CHROBAK.
TROLLEY WIRE GUARD.
APPLICATION FILED JUNE 11, 1920.

1,356,603.

Patented Oct. 26, 1920.
2 SHEETS—SHEET 2.

Inventors
E. A. Croston
K. Chrobak

Attorney

UNITED STATES PATENT OFFICE.

EMARD A. CROSTON AND KAZIMIER CHROBAK, OF ROSEMONT, WEST VIRGINIA.

TROLLEY-WIRE GUARD.

1,356,603.  Specification of Letters Patent.  Patented Oct. 26, 1920.

Application filed June 11, 1920. Serial No. 388,151.

*To all whom it may concern:*

Be it known that we, (1) EMARD A. CROSTON and (2) KAZIMIER CHROBAK, (1) a citizen of the United States of America and (2) a citizen of Poland, respectively, residing at Rosemont, in the county of Taylor and State of West Virginia, have invented certain new and useful Improvements in Trolley-Wire Guards, of which the following is a specification.

This invention relates to certain new and useful improvements in trolley wire guards and is particularly designed to safeguard miners against contacting with trolley wires in mines at unusually dangerous points such as where switches are located adjacent branch entries and mine rooms.

The primary object of the present invention is to provide a guard of the above kind so constructed and operable as to meet with all the requirements for a successful commercial use and embodying means which will effectively prevent the miner from contacting the trolley wire at points where the same is most likely to occur, while at the same time embodying structure and operating mechanism for permitting the guard to be manipulated so as to allow passage of a trolley pole and collector when necessary.

A still further object of the invention is to provide a trolley wire guard embodying a protecting tube adapted to normally inclose a portion of the length of the trolley wire at a dangerous point and composed of separable sections which are connected to suitable actuating means whereby these sections may be readily manually separated for permitting passage of a trolley pole and collector at will.

With the above general objects in view and others that will become apparent as the nature of the invention is better understood, the same consists in the novel combination, form and arrangement of parts hereinafter more fully described, shown in the accompanying drawings and claimed.

Figure 2:
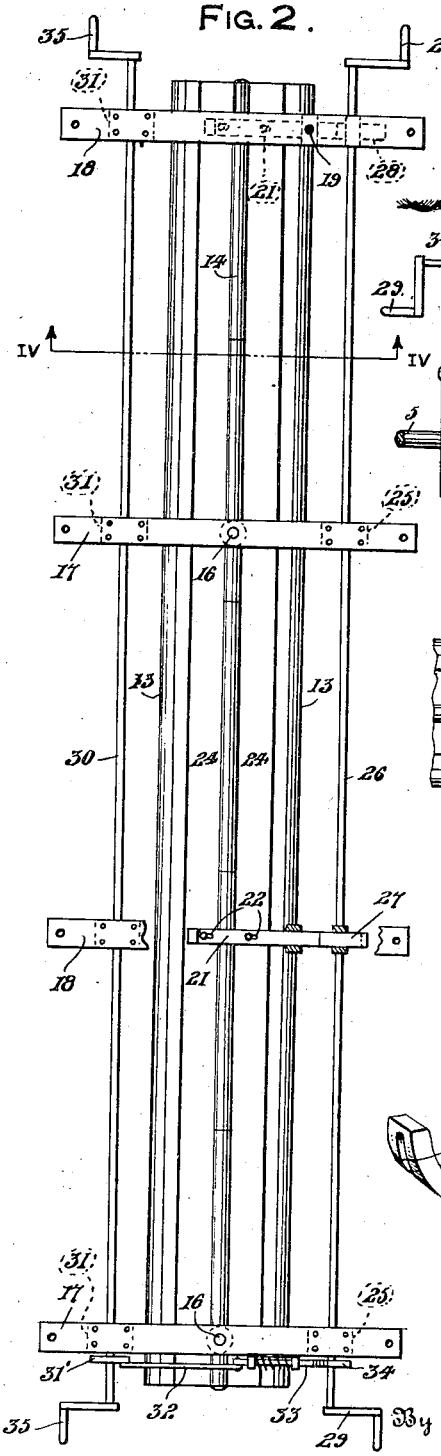

In the drawings, wherein like reference characters indicate corresponding parts throughout the several views, Figure 1 is a somewhat diagrammatic plan view of a portion of a room and pillar coal mine with the trolley wires therein equipped with guards in accordance with the present invention, Fig. 2 is a top plan view of one of the trolley guards, partly broken away.

Figure 6:
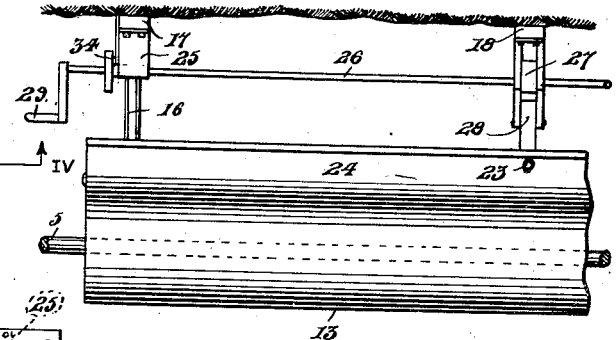
Figure 7:
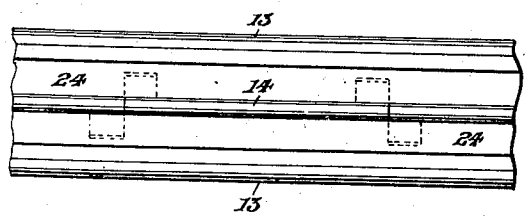
Figure 8:
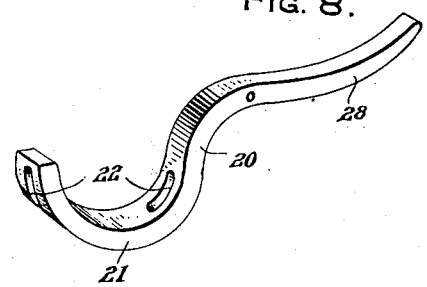

Fig. 3 is an end elevational view thereof,

Fig. 4 is a transverse sectional view taken substantially upon line IV—IV of Fig. 2, Fig. 5 is a view similar to Fig. 4 with the sections of the guard in expanded or separated relation, Fig. 6 is a fragmentary side elevational view of the device shown in Fig. 2, Fig. 7 is a fragmentary plan view of the tubular member of the guard, and Fig. 8 is a perspective view on an enlarged scale of the peculiar lever employed for separating the sections of the guard tube.

Referring more in detail to the several views, the present invention contemplates the provision of a guard for inclosing at desirable points the usual trolley wire 5 which is supported in the entries of coal mines adjacent the roof. Referring to Fig. 1, the main entry of the mine is shown at 6 and is provided with the usual tracks 7 upon which the hauling locomotives are run for transporting empty cars into the mine and loaded cars out of the mine. A branch entry 8 extends from the main entry and is similarly provided with tracks and a trolley wire 7 and 5 respectively. The rooms 9 are driven laterally from the main entry and branch tracks 10 extend into the rooms from the entry tracks 7.

As space is extremely limited in coal mines and the trolley wires 5 are thus necessarily supported so as to be within reach of the miners, it will be readily seen that considerable danger exists in the miners contacting the trolley wires especially at points where the miners have to pass this trolley wire when going from the main entry into the rooms as well as from the main entry to the branch entries.

This invention is primarily adapted to be employed as shown in Fig. 1 as at 11 adjacent the switches leading into the rooms 9 and as at 12 adjacent the switches leading from the main entry 6 to the branch entry 8 whereby considerable danger to the miners is eliminated.

Each trolley wire guard is composed of a tube of sufficient length to inclose the trolley wire 5 for the desired portion of its length. the tube being preferably formed of a pair of half sections 13 which are hingedly connected as at 14 so that the sections may be separated or closed as desired.

The sections 13 are preferably formed of a suitable non-conducting or insulating material and are rigidly supported in any suitable manner from the roof of the mine. As shown in Figs. 2, 3 and 6, this support for the tube may reside in suitable depending posts 16 attached at their lower ends to the tube at the pivot point of the sections of the latter and rigidly fastened at their upper ends to transverse cleats 17 which are secured rigidly to the roof of the mine as shown in Fig. 6.

Two further cleats 18 are also fastened to the roof of the mine, one at one end of the protecting tube and the other between the cleats 17, and a bracket 19 depends from and is rigid with each cleat 18. A lever 20 is pivoted intermediate its ends to each bracket 19 and each lever is provided with a curved end 21 having longitudinally disposed elongated slots 22 therein in spaced relation, each slot 22 being arranged for reception of a headed pin 23 fastened upon upward extensions 24 provided on each tube section 13. Further brackets 25 depend from and are rigid with the cleats 17 and 18 and these brackets 25 rotatably support a shaft 26 which is arranged outwardly of the brackets 19 as well as above and to one side of the tube formed by the sections 13. A cam 27 is fastened upon the shaft 26 adjacent the curved free end 28 of each lever 20 so that the periphery of each cam bears upon a concaved upper surface of a lever end 28. It will thus be seen that when the shaft 26 is rotated, the cams 27 cause the free ends of the levers 20 to be depressed and the inner ends thereof to be raised so as to cause the extensions 24 to be drawn toward each other whereby the tube sections 13 are separated or swung away from each other as shown in Fig. 5. When the sections are thus opened, it will be seen that the guard will then not interfere with the use of this portion of the trolley wire in permitting the passage of the trolley pole and collector of a mine locomotive with the collector in contact with the wire 5. Handles 29 are provided upon the ends of the shaft 26 so as to enable the operator of the locomotive to readily cause separation of the sections 13 when he reaches the guard tube while moving in either direction.

A second longitudinal shaft 30 is journaled in depending brackets 31 at the opposite side of the guard tube and parallel with the shaft 26, the lengths of the two shafts 26 and 30 being substantially the same and and slightly more than the length of the guard tube. A crank 31' is fastened upon the shaft 30 and is connected by a link 32 with a spring pressed latch 33 which is normally engaged with the ratchet teeth of a disk 34 secured upon the shaft 26. It will thus be seen that the latch 33 will normally engage the teeth of the disk 34 for preventing accidental rotation of shaft 26 so as to maintain the sections 13 closed as best seen in Fig. 3. Handles 35 are secured upon the opposite ends of the shaft 30 so that the operator may rotate the shaft 30 from either end of the guard tube for withdrawing the catch 33 from the teeth of the disk 34 so as to permit him to rotate the shaft 26 for separating the guard sections 13.

From the foregoing description it is believed that the construction and operation as well as the advantages of the present invention will be understood by those skilled in the art.

Minor changes may be made therein without departing from the spirit and scope of the invention as claimed.

What is claimed as new is:—

1. A trolley wire guard of the class described including a tube formed of separable sections, means to support said tube in position to inclose a portion of the length of a trolley wire in a mine, and means to separate the sections of the tube for permitting free passage of a trolley pole and collector with the collector engaged with the portion of the trolley wire normally inclosed by the tube.

2. A trolley wire guard of the class described including a tube formed of separable sections, means to support said tube in position to inclose a portion of the length of a trolley wire in a mine, means to separate the section of the tube for permitting free passage of a trolley pole and collector with the collector engaged with the portion of the trolley wire normally inclosed by the tube, and means to retain said sections against accidental separation.

3. A trolley wire guard of the class described including a tube formed of separable sections, means to support said tube in position to inclose a portion of the length of a trolley wire in a mine, and means to separate the section of the tube for permitting free passage of a trolley pole and collector with the collector engaged with the portion of the trolley wire normally inclosed by the tube, said means for separating the sections including an operating member arranged at each end of the tube.

4. A trolley wire guard of the class described including a tube formed of separable sections, means to support said tube in position to inclose a portion of the length of a trolley wire in a mine, means to separate the section of the tube for permitting free passage of a trolley pole and collector with the collector engaged with the portion of the trolley wire normally inclosed by the tube, said means for separating the sections including an operating member arranged at each end of the tube, and means to retain the sections against separation including a releasable latch and an operating member therefor arranged at each end of the tube.

5. A trolley wire guard of the class described including a supporting means, a tube rigidly suspended thereby and including a pair of separable sections, a lever for separating said sections, and means for operating said lever from either end of the tube.

In testimony whereof we affix our signatures.

EMARD A. CROSTON.
KAZIMIER CHROBAK.